(12) United States Patent  (10) Patent No.: US 7,268,884 B2
Kringlebotn et al.  (45) Date of Patent: Sep. 11, 2007

(54) WAVELENGTH REFERENCE SYSTEM FOR OPTICAL MEASUREMENTS

(75) Inventors: Jon Thomas Kringlebotn, Trondheim (NO); Hilde Nakstad, Trondheim (NO); Dag Thingbo, Vikhammer (NO)

(73) Assignee: Optoplan AS, Trondheim (NO)

( * ) Notice: Subject to any disclaimer, the term of this patent is extended or adjusted under 35 U.S.C. 154(b) by 398 days.

(21) Appl. No.: 10/745,291

(22) Filed: Dec. 23, 2003

(65) Prior Publication Data
US 2005/0134861 A1   Jun. 23, 2005

(51) Int. Cl.
*G01B 9/02* (2006.01)
(52) U.S. Cl. ...................................... 356/477
(58) Field of Classification Search ............... 356/477, 356/478, 480, 519; 372/32
See application file for complete search history.

(56) References Cited

U.S. PATENT DOCUMENTS

| | | | |
|---|---|---|---|
| 5,508,804 A * | 4/1996 | Furstenau | 356/477 |
| 5,838,437 A * | 11/1998 | Miller et al. | 356/478 |
| 6,097,487 A * | 8/2000 | Kringlebotn et al. | 356/480 |
| 6,421,120 B1 | 7/2002 | Wildnauer | |
| 6,449,047 B1 | 9/2002 | Bao et al. | |
| 2002/0131054 A1 | 9/2002 | Korn | |

OTHER PUBLICATIONS

U.K. Search Report, Application No. GB0427298.5, dated Feb. 18, 2005.
GB Examination Report, GB0427298.5, dated Jan. 24, 2006.

* cited by examiner

*Primary Examiner*—Hwa (Andrew) Lee
(74) *Attorney, Agent, or Firm*—Patterson & Sheridan, L.L.P.

(57) ABSTRACT

Devices and methods of accurately determining optical wavelengths, such as the Bragg wavelengths of an FBG sensor array. Wavelength-swept light having a characteristic spectrum is swept over a bandwidth and is applied to an interference filter. The interference filter produces an optical spectrum having one or more reference peaks that are identifiable because of the characteristic spectrum. The optical spectrum is converted into electrical signals having at least one electrical signal that is identifiable because of the characteristic spectrum. The identifiable electrical signal is used by a signal processor as an absolute, high accuracy wavelength reference. Temperature compensation or temperature stabilization can compensate the characteristic wavelength. Fiber Bragg sensor systems can use the wavelength reference to determine the Bragg wavelength of FBG elements. The characteristic spectrum can be imparted by the light source or an optical element such as a transmission line filter.

29 Claims, 6 Drawing Sheets

WAVELENGTH REFERENCE SYSTEM FOR OPTICAL MEASUREMENTS

BACKGROUND OF THE INVENTION

1. Field of the Invention

This invention relates to measuring optical wavelengths. More particularly, the present invention relates to wavelength reference systems suitable for use in fiber Bragg grating (FBG) sensor systems.

2. Description of the Related Art

A fiber Bragg grating (FBG) is an optical element formed by photo-induced modulation of the refractive index of the core of an optical fiber. An FBG element reflects light having a wavelength within a narrow bandwidth that is centered on a wavelength that is referred to as the Bragg wavelength. The Bragg wavelength depends not only on the optical fiber itself, but also on physical parameters such as temperature and strain that impact on the refractive index of the optical fiber. Therefore, FBG elements can be used as sensors to measure such physical parameters since, after proper calibration, the Bragg wavelength provides an absolute measure of the physical parameters.

While FBG elements are highly useful sensors, in most applications the Bragg wavelength has to be measured with a resolution, repeatability and accuracy of about 1 picometer (pm). With a Bragg wavelength of 1.55 microns, a shift of 1 pm corresponds to a change in temperature of approximately 0.1° C. Because of the required accuracy of the Bragg wavelength determination, some type of reference wavelength measurement system is usually required.

As previously indicated, because the Bragg wavelengths must be very precisely determined, an accurate reference is usually required. Making the problem of determining Bragg wavelengths more difficult is the fact that broadband sources and tunable filters are subject to gradients and ripples in the filtered light source spectrum that can induce small wavelength shifts in the measured peak wavelengths. This leads to uncertainties in the measured Bragg wavelength.

In practice, the Bragg wavelengths of one or more FBG elements are often measured using a broadband light source, for example an edge-light-emitting diode (ELED) or a superfluorescent fiber source (SFS), in combination with a tunable optical filter, for example a piezoelectric transducer (PZT) tunable fiber Fabry-Perot filter [see, for example, Kersey, A. D., Berkoff, T. A., and Morey, W. W., "Multiplexed fiber Bragg grating strain-sensor system with a fiber Fabry-Perot wavelength filter", Optics Letters, Vol. 18, pp. 1370-1372, 1993]. Alternatively, Bragg wavelengths can be determined using a tunable laser source, for example, an external cavity semiconductor laser with a tunable FBG reflector. Such as described in U.S. Pat. No. 5,401,956, issued on Mar. 28, 1995. Either way, an applied light source is swept over a range of wavelengths and the reflected wavelengths, which correspond to the Bragg wavelengths of the elements, are determined.

FBG sensor systems usually include a wavelength reference system to assist determining the Bragg wavelengths. Such reference systems are often based on a fixed cavity length interference filter, typically a fixed Fabry-Perot wavelength filter, and at least one reference FBG. When the wavelength swept light is input to the fixed cavity length interference filter the output of the filter is a pulse train that represents the fringes/peaks of the optical transmission, or of the reflection spectrum, of the filter, i.e., a comb spectrum having constant frequency spacing. This wavelength reference system reduces problems associated with non-linearity, drift and hysterisis. The reference FBG element can be used either for identification of one of the individual interference filter comb peaks, which is then used as the wavelength reference, or for relative wavelength measurements between FBG sensor elements and the reference FBG. Thus, the comb spectrum establishes a frequency/wavelength scale.

The resonance wavelength of a fixed Fabry-Perot wavelength filter can shift by about 13 pm/° C., which is about the same as the wavelength shift of an unstrained FBG. By calibrating both the comb peak wavelengths of the reference fixed Fabry-Perot wavelength filter and of the reference FBG vs. temperature, and by accurately measuring the temperatures of the fixed Fabry-Perot wavelength filter and of the reference FBG, the Bragg wavelengths of the FBGs sensors can be accurately determined. Alternatively, the temperatures of the fixed Fabry-Perot wavelength filter and of the reference FBG can be stabilized using an oven or an ice bath.

One problem that occurs when using one or more reference FBG elements is that they occupy one or more wavelength bands, which limits the total available bandwidth, and hence the number of wavelength multiplexed FBG sensor elements that can be used. Additionally, reference FBG elements add complexity and cost to the overall system.

Therefore, a device and method for accurately measuring optical wavelengths, in particular reflected Bragg wavelengths of one or more wavelength multiplexed FBG elements would be beneficial. An accurate wavelength reference system that enables accurate wavelength measurements over a wide wavelength range, and which is relatively insensitive to changes in temperature over a wide range of operating temperatures, would also be beneficial. A new FBG sensor system that does not require the use a reference FBG would be particularly useful.

SUMMARY OF THE INVENTION

The principles of the present invention provide for devices and methods of accurately determining optical wavelengths. Such devices and methods are particularly well suited for determining Bragg wavelengths of FBG elements.

The present invention uses a wavelength-swept light beam having a characteristic spectrum. That light beam could be produced by a broadband light source, e.g., a rare-earth doped superfluorescent fiber source, and a tunable optical filter that produces a wavelength-swept light beam that scans across a wavelength band that covers all wavelengths that are to be determined. Alternatively, the wavelength-swept light beam could be produced by a tunable laser that emits a wavelength-swept light beam having an output power that is varied with time in a well defined manner. At least part of the wavelength-swept light is applied to a fixed, free spectral range interference filter, e.g., a fixed cavity Fabry-Perot filter. The wavelength-swept light beam produces a spectral envelope that forms reference comb peaks in the interference filter. One (or more) of the reference interference filter comb peaks is identified based on the characteristic spectrum. Such an identified peak can be used for absolute, high accuracy wavelength referencing.

The wavelength of the identified comb peak is calibrated as a function of temperature. By measuring the temperature of the reference interference filter, or by stabilizing that temperature, the wavelengths of the identified comb peak and of the other comb peaks can be accurately determined and used to measure other wavelengths.

One or more of the reference interference filter comb peaks are used by a signal processor for absolute, high accuracy wavelength referencing. The Bragg wavelengths are then determined using one or more of the characteristic reference interference filter comb peaks.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

Figure 1:
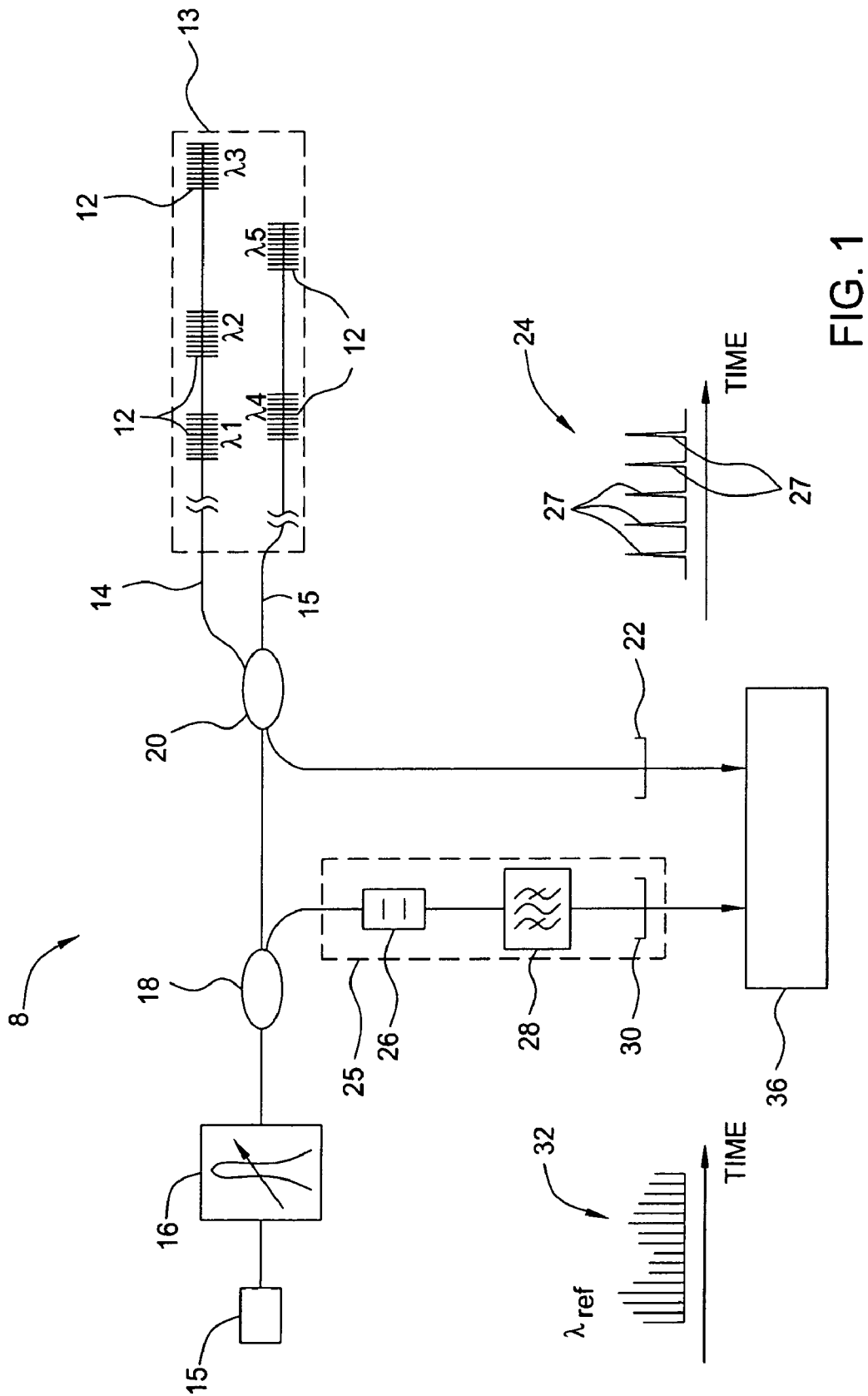

In the following the invention will be described by means of examples of embodiments and with reference to illustrations, where:

FIG. 1 depicts a wavelength measurement system for determining the Bragg wavelengths of a series of wavelength multiplexed FBG elements.

Figure 2:
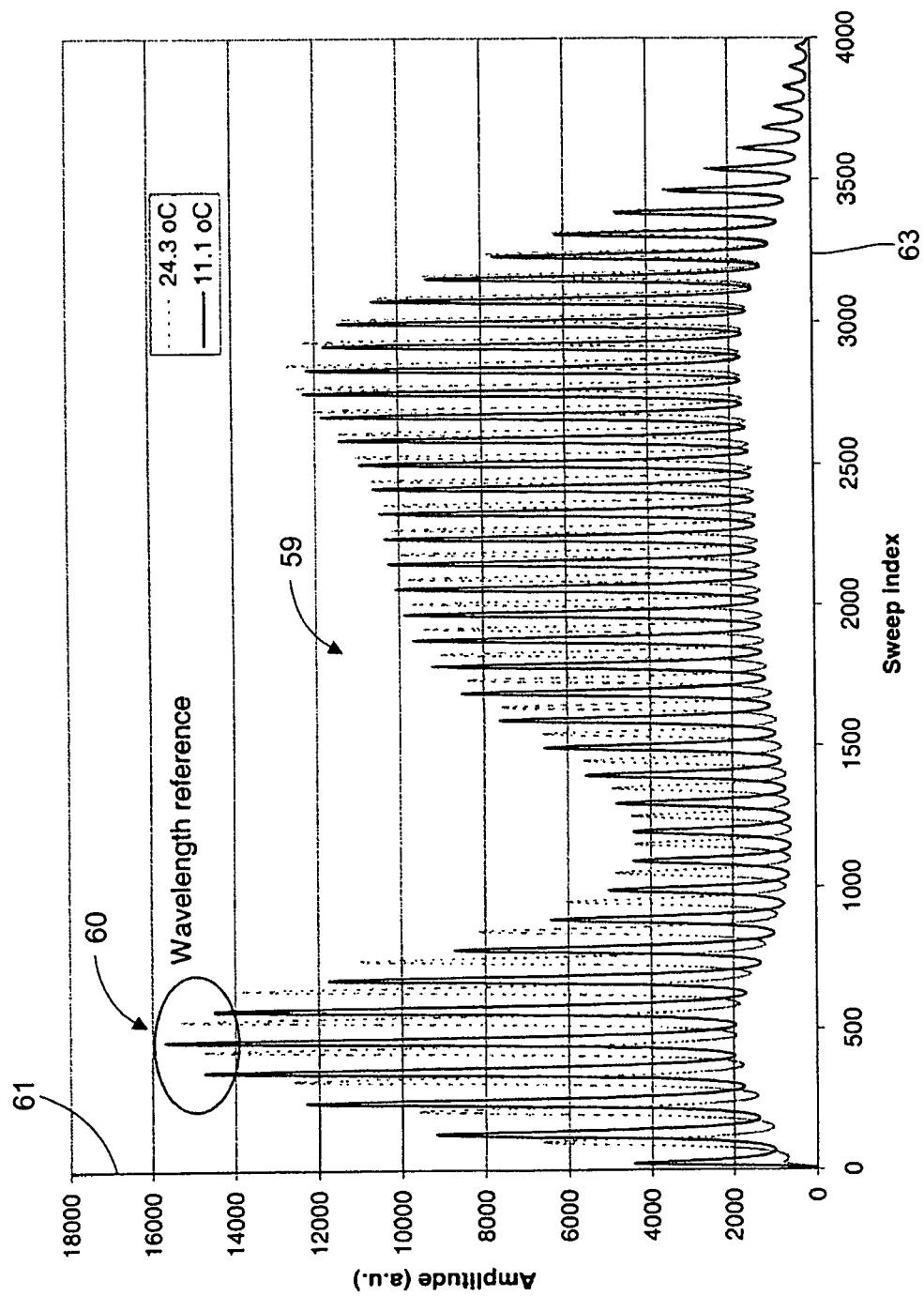
Figure 3:
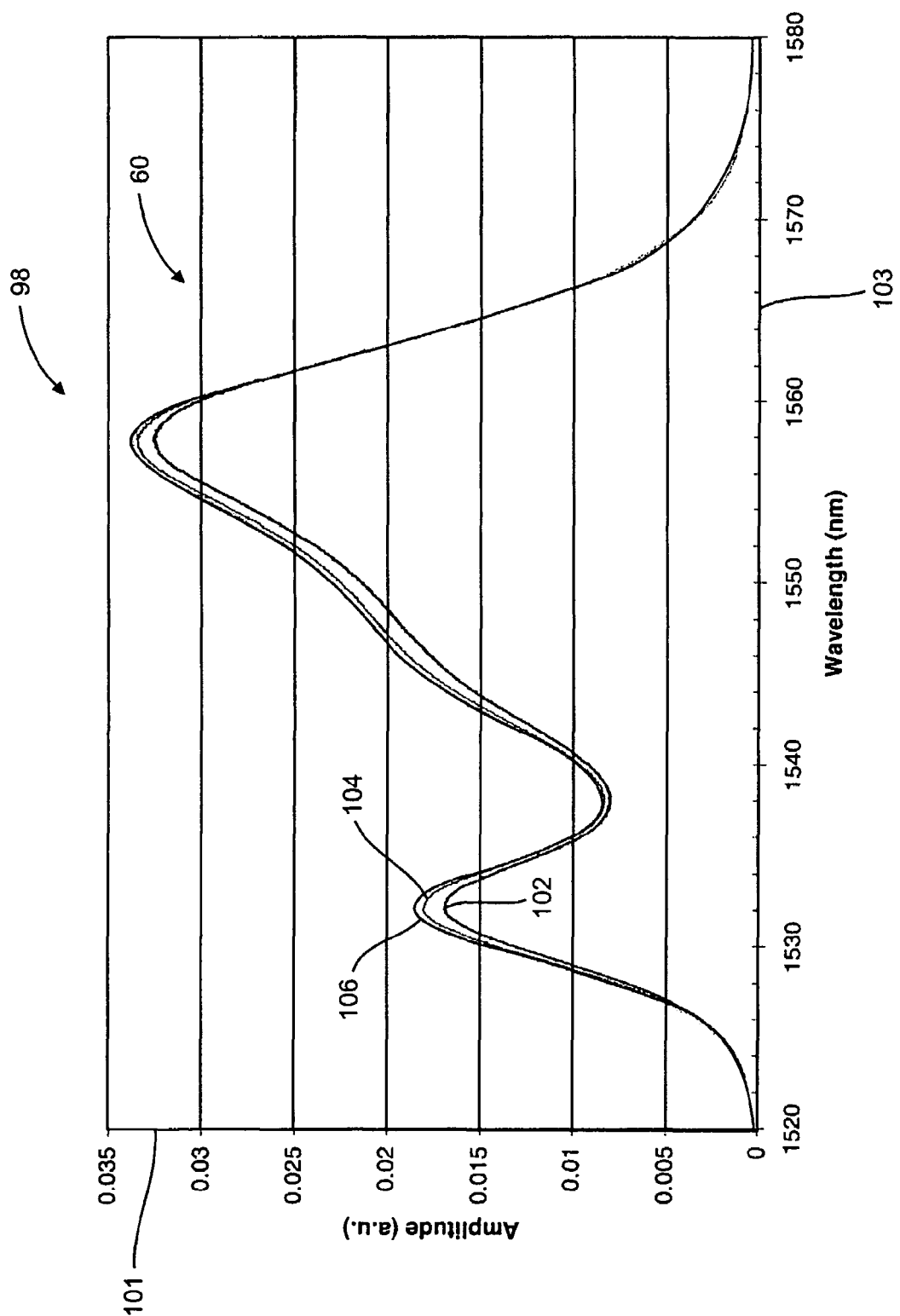
Figure 4:
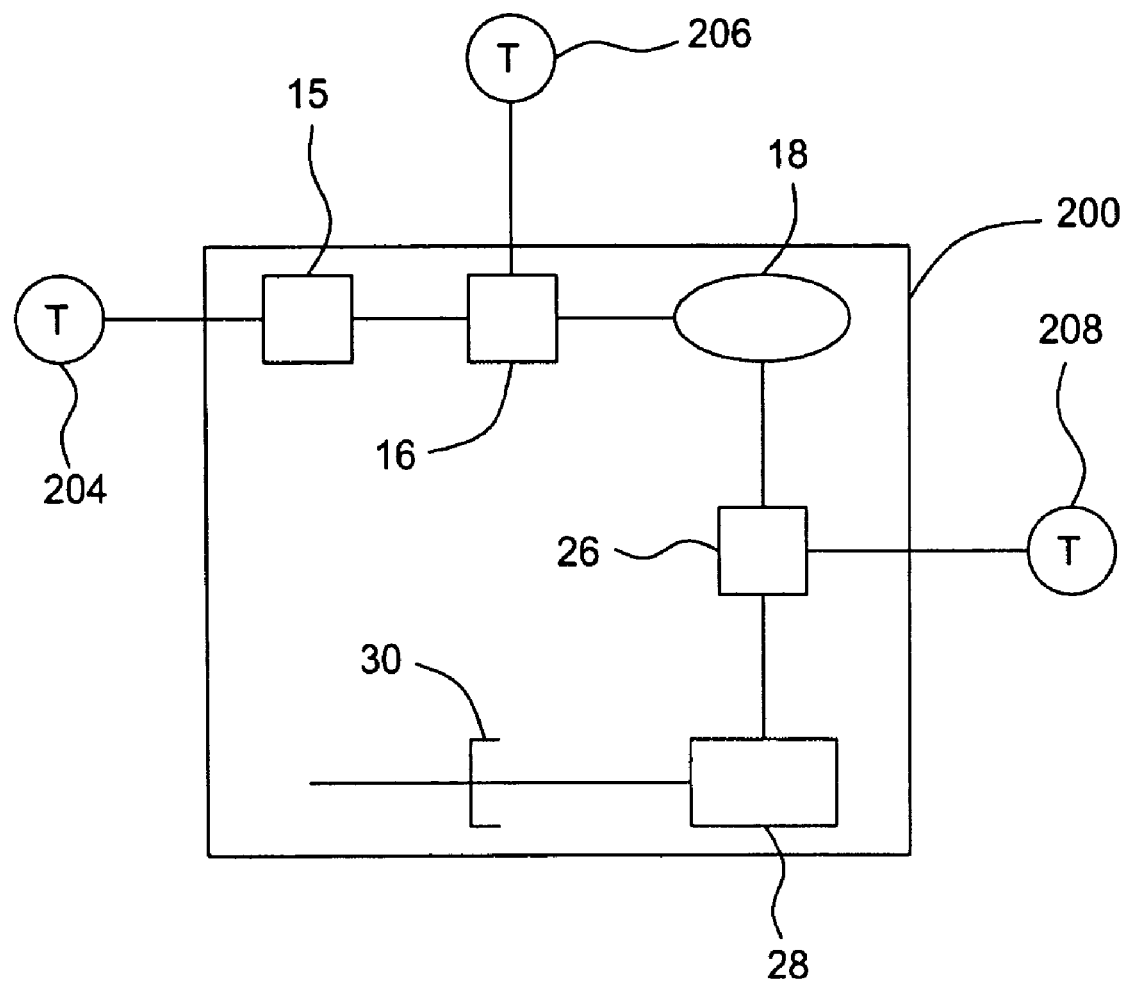
Figure 5:
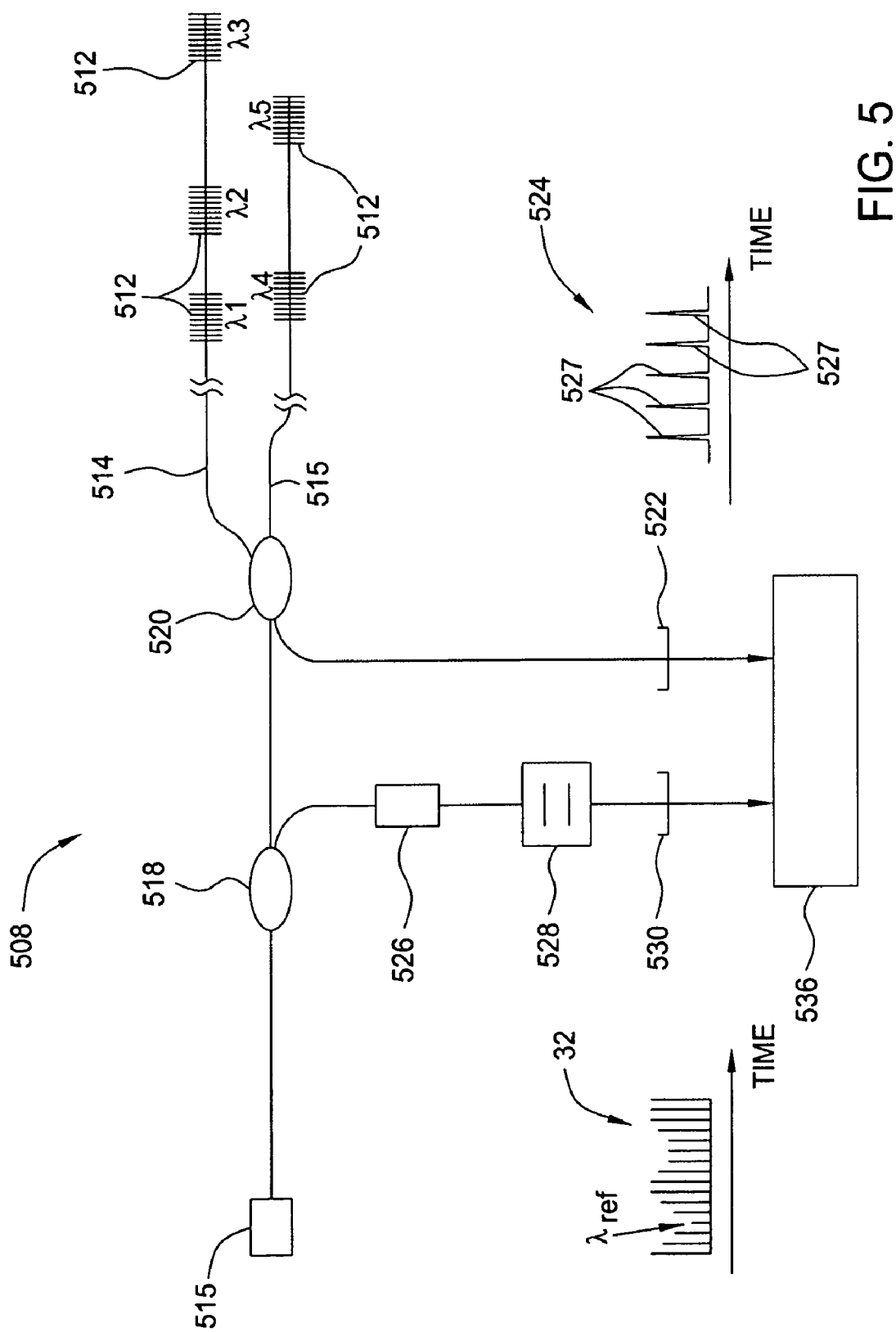
Figure 6:
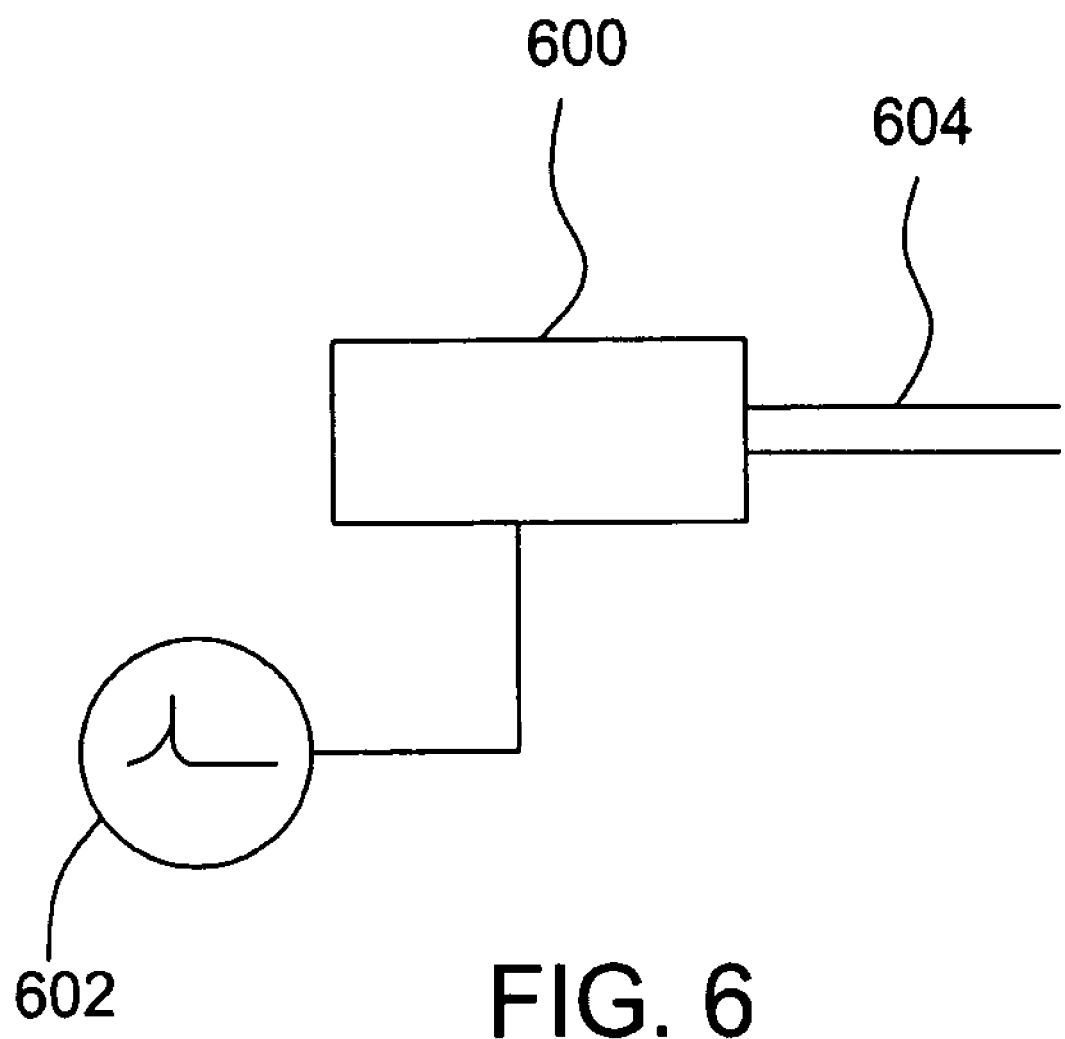

FIG. 2 depicts the characteristic reference comb spectrum at the output of the reference fixed cavity F-P filter of a broadband source at two different temperatures used in the system of FIG. 1;

FIG. 3 depicts the source spectrum of a broadband, superfluorescent erbium-doped fiber source at three different temperatures;

FIG. 4 depicts an apparatus for compensating for temperature;

FIG. 5 depicts producing light having a characteristic spectrum with at least one comb peak using a transmission filter; and FIG. 6 depicts producing light having a characteristic spectrum with at least one comb peak using a variable output power laser.

DETAILED DESCRIPTION

The present invention provides for a method and apparatus for accurately determining optical wavelengths. Such methods and apparatus are particularly well suited for determining Bragg wavelengths of FBG elements. As such, the principles of the present invention are illustrated in a wavelength measurement system 8 having wavelength multiplexed FBG elements 12 on an FBG sensor array 13, reference FIG. 1. As shown, the FBG sensor array 13 may be comprised of one or more optical fibers 14 and 15. The wavelength measurement system 8 is suitable for measuring pressure and temperature in hostile environments such as occurs in oil wells.

The wavelength measurement system 8 determines the Bragg wavelengths of the FBG elements 12, which are then used to determine a physical parameter of interest. The wavelength measurement system 8 includes a light source that produces a narrow band, bandwidth-swept light beam having a characteristic spectrum that scans across a wavelength band that includes the Bragg wavelengths of the FBG elements 12. For example FIG. 1 uses a broadband light source 15 that emits light having a characteristic spectrum, for example, a superfluorescent erbium-doped fiber light source, and a piezoelectrically tunable fiber F-P filter 16. As shown, the broadband light source 15 directs light into the piezoelectrically tunable fiber F-P filter 16. Alternatively, a tunable laser having optical power that is varied in a controlled manner could be used (reference FIG. 6).

In FIG. 1, the tunable fiber F-P filter 16 has a free spectral range that exceeds the wavelength range of the FBG elements 12, and a bandwidth that is similar to the bandwidths of the FBG reflection spectra. Additionally, as is well known, rare-earth doped superfluorescent sources produce characteristic wavelength spectrums with characteristic peaks (thus, a characteristic envelope) having relative magnitudes and wavelengths (described subsequently with reference to FIG. 2) that depend on the strengths of the Stark transitions of the rare-earth ions. Those peaks are glass dependent, with population inversions occurring along the optical fiber in a manner that depends on the pump wavelength and on the pump power. In particular, the wavelength spectrum of a superfluorescent erbium-doped fiber source has a characteristic peak around 1531 nm with a 3 dB bandwidth of around 7 nm. The wavelength of this peak changes very little with pump power and temperature, typically <3 pm/° C.

The narrow band, bandwidth-swept light beam from the tunable fiber F-P filter 16 is split by a fiber optic directional coupler 18. The main portion of that light is coupled to the FBG sensor array 13 via a second directional coupler 20. Reflected light from the FBG sensor array 13, which occurs when the wavelength of the narrow band, bandwidth-swept light beam matches the Bragg wavelength of one or more FBG elements 12, passes back into the directional coupler 20 and onto a sensor receiver 22. The sensor receiver 22 converts the Bragg wavelength reflection into a sensor electrical pulse train as illustrated in graph 24. Each sensor pulse 27 represents a Bragg wavelength of an FBG element 12.

A portion of the light from the tunable fiber F-P filter 16 is directed by the fiber optic directional coupler 18 into a reference arm 25 having the fixed, free spectral range interference filter 26, which is, for example, a fixed cavity F-P fiber filter. The interference filter 26 produces an optical spectrum having optical comb peaks with a constant, known (or determinable) frequency separation. The optical comb peaks include at least one optical comb peak that is identifiable because of the characteristic spectrum of the light source. This is explained in more detail subsequently.

If the wavelength spectrum of the broadband source 15 is broader than the free spectral range of the tunable fiber Fabry-Perot filter 16, the reference arm also includes an optical bandpass filter 28 that has a narrower passband than the free spectral range. In any event, the reference comb spectrum is passed onto a reference receiver 30 which produces a reference electrical pulse train as illustrated by a graph of a reference comb spectrum 32. The reference receiver 30 is also part of the reference arm 25. While the reference arm 25 includes the interference filter 26 and the reference receiver 30, and possibly the optical band pass filter 28, the reference arm 25 does not include an FBG element.

The electrical signals from the sensor receiver 22 and from the reference receiver 30 are sequentially sampled, processed and compared in a signal processing system 36. That unit interrogates the reference electrical pulse train to identify at least one characteristic element, such as a characteristic peak, of the characteristic wavelength spectrum. The identified characteristic element is then used as a reference to determine the Bragg wavelengths. The characteristic element has an accurately known wavelength. Once that peak is identified, since the separation of the peaks of the electrical signals is known, all of the reference peak wavelengths are known or can be determined. Then, the FBG sensor wavelengths can be compared to the now known reference peak wavelengths. Thus, the FBG sensor wavelengths can be accurately determined.

With the FBG sensor wavelengths accurately determined the signal processing system 36 can produce measurements of a physical parameter that influences the Bragg wavelengths. Thus, the reference receiver 30 signals provide accurate and repeatable information that can be used to determine the Bragg wavelengths of the FBG elements 12. The time resolution is limited by the scan time of the tunable fiber Fabry-Perot filter 16, and/or the processing time of the signal processing unit 36.

In the embodiment shown in FIG. 1, the wavelengths of the reference comb peaks are identified by the characteristic spectral envelope of the broadband light source 15. That spectrum is sampled by the interference filter 26 to produce the reference comb spectrum 32, which is depicted in more detail in FIG. 2. In FIG. 2, the Y-axis 61 represents the signal amplitude while the X-axis 63 depicts the sweep index, which is a measure of wavelength. The reference comb spectrum 32 produces characteristic peaks that may vary slightly with temperature. For example, the reference comb spectrum 32 includes a maximum amplitude comb peak 60 at 1531 nm which is very stable. That maximum amplitude comb peak 60, which is characteristic of the rare-earth doped superfluorescent source, will always be greater than the surrounding peaks and can thus be readily identified.

Thus, the maximum amplitude comb peak 60 provides a reference near 1531 nm that is easily identified, but which may vary slightly from 1531 nm due to temperature. FIG. 2 illustrates characteristic peaks at 11.1° C., shown in solid, and related characteristic peak sat 24.3° C., shown in dashed lines. Those characteristic peaks are not only relatively stable with temperature, they are stable over time. Either by locating the interference filter 26 in a temperature controlled environment, such as an ice bath, or by measuring the temperature of the interference filter 26 and then compensating the wavelength of the maximum amplitude comb peak 60 for temperature, the wavelength of the maximum amplitude comb peak 60 can be accurately determined and used as an accurate reference.

FIG. 3 depicts a graph 98 of amplitude (axis 101) verses wavelength (axis 103) for the output of a superfluorescent erbium-doped fiber source near the characteristic 1531 nm peak wavelength at three temperatures: at 22° C. as shown by the bottom line 102; at 30.2° C. as shown by the center line 104; and at 42.5° C. as shown by the top line 106. Over temperature, the characteristic 1531 nm peak wavelength changes less than 3 pm/° C.

Referring now once again to FIG. 2, the wavelength of the reference comb spectrum peaks changes about 13 pm/° C. It should be noted that FIG. 2 illustrates the reference comb spectrum as a function of the sweep index of the piezoelectrically (PZT) tunable F-P filter 16, which has a comb frequency spacing of 125 GHz (1 nm at 1550 nm). The sweep index represents the sweep time or the PZT voltage of the tunable F-P filter 16. The wavelength separation of the comb peaks can be calibrated/measured with an accurate wavelength meter or spectrum analyzer. Alternatively, when calibrating a particular system the wavelength separation of the comb peaks can be determined using reference FBG having known wavelengths.

Referring now to FIGS. 2 and 3, while the position of the comb peaks may change with temperature due to the temperature sensitivity of the tunable fiber F-P filter 16 and of the interference filter 26, the general shape and the characteristic peak wavelengths of the envelope changes very little with temperature. In particular, the source spectrum illustrated in FIG. 3 has a 1531 nm peak, which has a 3 dB bandwidth of 7 nm, which has extremely stable characteristics.

Once the wavelength of the comb peak with the largest amplitude, which is always positioned around 1531 nm, is temperature compensated, that peak can be used as an absolute wavelength reference. As noted, temperature compensation can be performed either by temperature stabilizing the tunable fiber Fabry-Perot filter 16 and the interference filter 26, such as by using an oven or ice bath, or by temperature measurement and subsequent wavelength correction. FIG. 4 illustrates a fixed temperature enclosure 200 that encloses the broadband light source 15, the tunable fiber Fabry-Perot 16, the coupler 18, the optical band pass filter 28, the interference filter 26, and the reference receiver 30. The fixed temperature enclosure 200 could be a temperature controlled oven or an ice bath. Additionally, FIG. 4 illustrates measuring the temperature of the broadband light source 15, the fiber Fabry-Perot filter 16 and the interference filter 26 using temperature sensors 204, 206, and 208. The output of the temperature sensors can be input to signal processing system 36, which can then temperature compensate the Bragg wavelengths. It should also be noted that rather than using the highest peak (1531 nm), the entire whole spectral envelope, or part of that envelope, could also be used for comb peak identification.

While the foregoing has described using a characteristic broadband light spectrum to create a characteristic spectral envelope, there are other methods of creating such characteristic spectral envelopes. For example, FIG. 5 illustrates a wavelength measurement system 508 that determines the Bragg wavelengths of FBG elements 512, which can then be used to determine a physical parameter of interest. The wavelength measurement system 508 includes a light source 515, typically a wavelength-swept laser or a broadband light source (such as an LED) in combination with a tunable filter, which produces a wavelength-swept light beam. The light from the light source sweeps across a wavelength band that includes the Bragg wavelengths of the FBG elements 512.

The bandwidth-swept light beam from the light source 515 is split by a fiber optic directional coupler 518. The main portion of the light is coupled to the FBG sensor elements 512 via a second directional coupler 520. Reflected light from the FBG elements 512, which occurs when the wavelength of the bandwidth-swept light matches the Bragg wavelength of one or more FBG elements 512, passes back into the directional coupler 520 and onto a sensor receiver 522. The sensor receiver 522 converts the Bragg wavelength reflection into a sensor electrical pulse train as illustrated in graph 524. Each sensor pulse 527 represents a Bragg wavelength of an FBG element 512.

A portion of the bandwidth-swept light from the light source 515 is directed by the fiber optic directional coupler 518 into a transmission filter 526 that imparts a characteristic spectral feature onto the bandwidth-swept light. For example, a transmission filter 526 can be formed from an unpumped section of an erbium-doped fiber (EDF). Such an EDF fiber acts as an absorption filter having a characteristic dip around 1531 nm that changes relatively little with temperature, typically <3 pm/° C. Thus, in the wavelength measurement system 508 an erbium-doped fiber is used in a passive filter rather than in a light source as in the wavelength measurement system 8 of FIG. 1.

The output of the transmission filter 526 is applied to an interference filter 528 that produces a reference comb spectrum having optical comb peaks with a constant, known (or determinable) frequency separation. The reference comb spectrum also includes at least one spectral feature, such as an optical comb dip, that is identifiable because of the transmission filter 526. The reference comb spectrum is passed onto a reference receiver 530, which produces a reference electrical pulse train as illustrated by a graph 532. Note the dip at $\lambda_{ref}$.

The electrical signals from the sensor receiver 522 and from the reference receiver 530 are sequentially sampled, processed and compared in a signal processing system 536. That unit interrogates the reference electrical pulse train to identify the characteristic dip of the characteristic wavelength spectrum. The identified characteristic dip is then used as a reference to determine the Bragg wavelengths.

As noted, the transmission filter may be a section of erbium-doped doped fiber. Further, while not shown in FIG. 5, for some embodiments, an optical isolator may be disposed between the transmission filter and the interference filter to prevent back reflections from the interference filter into the transmission filter.

There are other approaches to creating a characteristic spectral envelope. For example, as shown in FIG. 6, an alternative approach is to varying the power of a tunable light source 600 using a variable power control device 602 such that the light output 604 has known power-output wavelength dependence and such that a characteristic spectrum having at least one comb peak is produced. Thus characteristic spectral features can be produced using a tunable source, and/or a tunable filter, and/or a broadband light source.

While the foregoing is directed to various embodiments of the present invention, other and further embodiments of the invention may be devised without departing from the basic scope thereof, and the scope thereof is determined by the claims that follow.

The invention claimed is:

1. An optical wavelength measurement system comprising:
   a light source for producing wavelength-swept light having a characteristic spectrum;
   an interference filter for receiving said wavelength-swept light and for producing optical comb peaks, wherein at least one optical comb peak is identifiable because of said characteristic spectrum;
   a reference receiver for converting said optical comb peaks into electrical signals, wherein said at least one optical comb peak produces an identifiable electrical signal; and
   a signal processing system for receiving reference electrical signals from said reference receiver, wherein said signal processing system determines a reference wavelength from said identifiable electrical signal.

2. A system according to claim 1 wherein said light source includes a broadband light source and a tunable optical filter.

3. A system according to claim 2 wherein said broadband light source is a superfluorescent erbium-doped fiber light source.

4. A system according to claim 3 wherein said characteristic spectrum has a characteristic peak around 1531 nm.

5. A system according to claim 2 wherein said characteristic wavelength spectrum has characteristic peaks with relative magnitudes and wavelengths that depend on Stark transitions of rare-earth ions.

6. A system according to claim 1 wherein said light source includes a tunable laser.

7. A system according to claim 1 wherein said light source includes an optical filter having a broadband transmission window having one or more characteristic spectral features.

8. A system according to claim 1 further including an optical filter that is optically disposed between said light source and said interference filter, wherein said optical filter limits the wavelengths applied to said interference filter.

9. A system according to claim 1 further including means for temperature stabilizing said interference filter.

10. A system according to claim 1 wherein said signal processing system includes temperature compensation of said identifiable electrical signal.

11. A fiber Bragg grating (FBG) sensor system comprised of:
    a light source for producing wavelength-swept light having a characteristic spectrum;
    a first optical coupler for coupling a first portion of said wavelength-swept light onto a reference path and for coupling a second portion of said wavelength-swept light along a sensing path;
    an interference filter in said reference path for receiving said first portion and for producing optical comb peaks, wherein at least one optical comb peak is identifiable because of said characteristic spectrum;
    a reference receiver for converting the optical comb peaks into electrical signals, wherein said at least one optical comb peak produces an identifiable electrical signal;
    a sensor receiver for converting applied light into sensor electrical signals,
    a second optical coupler for coupling said second portion onto an optical fiber having at least one fiber Bragg grating element, said second optical coupler for coupling reflections from said fiber Bragg grating element as applied light to said sensor receiver; and
    a signal processing system for receiving said reference electrical signals and said sensor electrical signals, wherein said signal processing system determines a reference wavelength from said identifiable electrical signal, and wherein said signal processing system uses said identified electrical signal to determine a Bragg wavelength of said fiber Bragg grating element.

12. A system according to claim 11 wherein said light source includes a broadband light source and a tunable optical filter.

13. A system according to claim 12 wherein said broadband light source is a superfluorescent erbium-doped fiber light source.

14. A system according to claim 11 wherein said characteristic spectrum has a characteristic peak around 1531 nm.

15. A system according to claim 11 wherein said characteristic spectrum has characteristic peaks with relative magnitudes and wavelengths that depend on Stark transitions of rare-earth ions.

16. A system according to claim 11 wherein said light source includes a tunable laser.

17. A system according to claim 11 wherein said light source includes an optical filter having a broadband transmission window having one or more characteristic spectral features.

18. A system according to claim 11 further including an optical filter that is optically disposed between said light source and said interference filter, wherein said optical filter limits the wavelengths applied to said interference filter.

19. A system according to claim 11 further including means for temperature stabilizing said interference filter.

20. A system according to claim 11 wherein said signal processing system includes temperature compensates said identifiable electrical signal.

21. A system according to claim 11 wherein said first optical coupler is a fiber optic directional coupler.

22. A method of determining a fiber Bragg grating wavelength to produce measurements of a physical parameter, comprising:

producing source light having a characteristic wavelength spectrum;

coupling a first portion of the source light onto a reference path and a second portion of the source light along a sensing path having least one fiber Bragg grating element;

interference filtering the first portion to produce an optical comb spectrum having at least one peak that is identifiable because of said characteristic spectrum;

producing reference electrical signals that correspond to the optical comb spectrum such that a reference electrical signal is identifiable because of the characteristic spectrum;

identifying the comb peak in the reference electrical signals to provide an identified reference electrical signal;

detecting reflections from the fiber Bragg grating element to produce sensor electrical signals that correspond to the fiber Bragg grating wavelength;

using the identified reference electrical signal to determine the fiber Bragg grating wavelength; and producing measurements of the physical parameter that influences the Bragg grating wavelength.

23. A method according to claim 22 further including temperature stabilizing the source light.

24. An optical wavelength measurement system comprising:

a light source for producing wavelength-swept light;

an absorption transmission filter receiving said wavelength-swept light, said transmission filter for imparting a characteristic spectrum to said wavelength-swept light, wherein said transmission filter includes an unpumped section of erbium-doped fiber;

an interference filter for receiving said wavelength-swept light having said characteristic spectrum and for producing optical comb peaks from said received wavelength-swept light, wherein at least one optical comb peak is identifiable because of said characteristic spectrum;

a reference receiver for converting said optical comb peaks into electrical signals, wherein said at least one optical comb peak produces an identifiable electrical signal; and a signal processing system for receiving reference electrical signals from said reference receiver, wherein said signal processing system determines a reference wavelength from said identifiable electrical signal.

25. A system according to claim 24 wherein said light source includes a broadband light source and a tunable optical filter.

26. A system according to claim 24 wherein said characteristic spectrum is a dip around 1531 nm.

27. A fiber Bragg grating (FBG) sensor system comprised of:

a light source for producing wavelength-swept light;

a first optical coupler for coupling a first portion of said wavelength-swept light onto a reference path and for coupling a second portion of said wavelength-swept light along a sensing path;

an absorption transmission filter in said reference path for receiving said first portion and for imparting a characteristic spectrum on said first portion, wherein said transmission filter includes an unpumped section of erbium-doped fiber;

an interference filter in said reference path for receiving said first portion having a characteristic spectrum and for producing optical comb peaks, wherein at least one optical comb peak is identifiable because of said characteristic spectrum;

a reference receiver for converting the optical comb peaks into electrical signals, wherein said at least one optical comb peak produces an identifiable electrical signal;

a sensor receiver for converting applied light into sensor electrical signals;

a second optical coupler for coupling said second portion onto an optical fiber having at least one fiber Bragg grating element, said second optical coupler for coupling reflections from said fiber Bragg grating element as applied light to said sensor receiver; and a signal processing system for receiving said reference electrical signals and said sensor electrical signals, wherein said signal processing system determines a reference wavelength from said identifiable electrical signal, and wherein said signal processing system uses said identified electrical signal to determine a Bragg wavelength of said fiber Bragg grating element.

28. A system according to claim 27 wherein said light source includes a broadband light source and a tunable optical filter.

29. A system according to claim 27 wherein said characteristic spectrum has a characteristic dip around 1531 nm.

* * * * *